(12) United States Patent
Gasparino, Jr.

(10) Patent No.: US 11,904,392 B1
(45) Date of Patent: Feb. 20, 2024

(54) RATCHETING ANTI-LOCK CHUCK GUARD FOR LATHE

(71) Applicant: Joseph Peter Gasparino, Jr., Granger, IN (US)

(72) Inventor: Joseph Peter Gasparino, Jr., Granger, IN (US)

(*) Notice: Subject to any disclaimer, the term of this patent is extended or adjusted under 35 U.S.C. 154(b) by 0 days.

(21) Appl. No.: 18/225,917

(22) Filed: Jul. 25, 2023

(51) Int. Cl.
 *B23B 25/04* (2006.01)
 *B23Q 11/08* (2006.01)

(52) U.S. Cl.
 CPC .............. *B23B 25/04* (2013.01); *B23Q 11/08* (2013.01); *B23Q 11/0825* (2013.01); *B23B 2260/122* (2013.01)

(58) Field of Classification Search
 CPC ... B23B 25/04; B23B 2260/122; B23Q 11/08; B23Q 11/0825
 See application file for complete search history.

(56) References Cited

U.S. PATENT DOCUMENTS

| | | | | |
|---|---|---|---|---|
| 4,522,246 A | * | 6/1985 | Bierbrauer | B23Q 11/0825 384/15 |
| 5,435,675 A | * | 7/1995 | Rutschle | B23Q 1/66 29/DIG. 56 |
| 9,592,557 B2 | | 3/2017 | Gardner et al. | |
| 2006/0130608 A1 | * | 6/2006 | Jones | F16P 1/00 74/616 |
| 2018/0361522 A1 | * | 12/2018 | Fornasero | B23Q 1/64 |

FOREIGN PATENT DOCUMENTS

| | | | | |
|---|---|---|---|---|
| CN | 106881468 A | * | 6/2017 | |
| DE | 3530976 A1 | * | 3/1987 | |
| DE | 10123580 A1 | * | 11/2002 | ......... B23Q 11/0825 |
| DE | 202005005273 U1 | * | 12/2005 | ......... B23Q 11/0825 |
| EP | 1840448 A1 | * | 10/2007 | ......... B23Q 11/0825 |
| GB | 668826 A | * | 3/1952 | |
| GB | 1188800 A | * | 4/1970 | |
| GB | 2543650 A | * | 4/2017 | ......... B23Q 11/0078 |

* cited by examiner

*Primary Examiner* — Eric A. Gates
(74) *Attorney, Agent, or Firm* — Dale J. Ream

(57) ABSTRACT

A ratcheting anti-lock chuck guard for regulating access to a lathe chuck includes a guard assembly having a main body section and an actuation section pivotally coupled to the main body section. The chuck guard includes an access assembly having a mounting shaft coupled to the guard assembly and a ratcheting assembly coupled to the shaft, the ratcheting assembly being rotatably movable to predetermined angular positions when urged by actuation of the guard assembly. The guard assembly is rotated to an open configuration as the mounting shaft and ratcheting assembly is rotated. The ratcheting assembly includes a serrated lock wheel coupled to the mounting shaft that has a plurality of teeth each defining a lock pocket and includes a lock pawl configured to communicate with the lock pockets as the ratcheting assembly is incrementally operated. Operation the lathe is locked until the chuck guard is rotated to a predetermined angle/position.

20 Claims, 16 Drawing Sheets

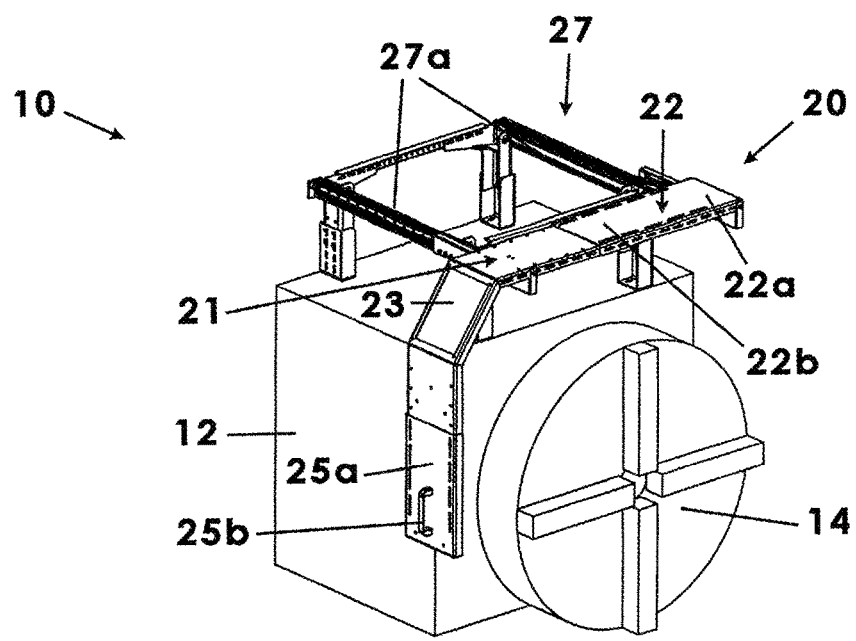
Fig. 3a
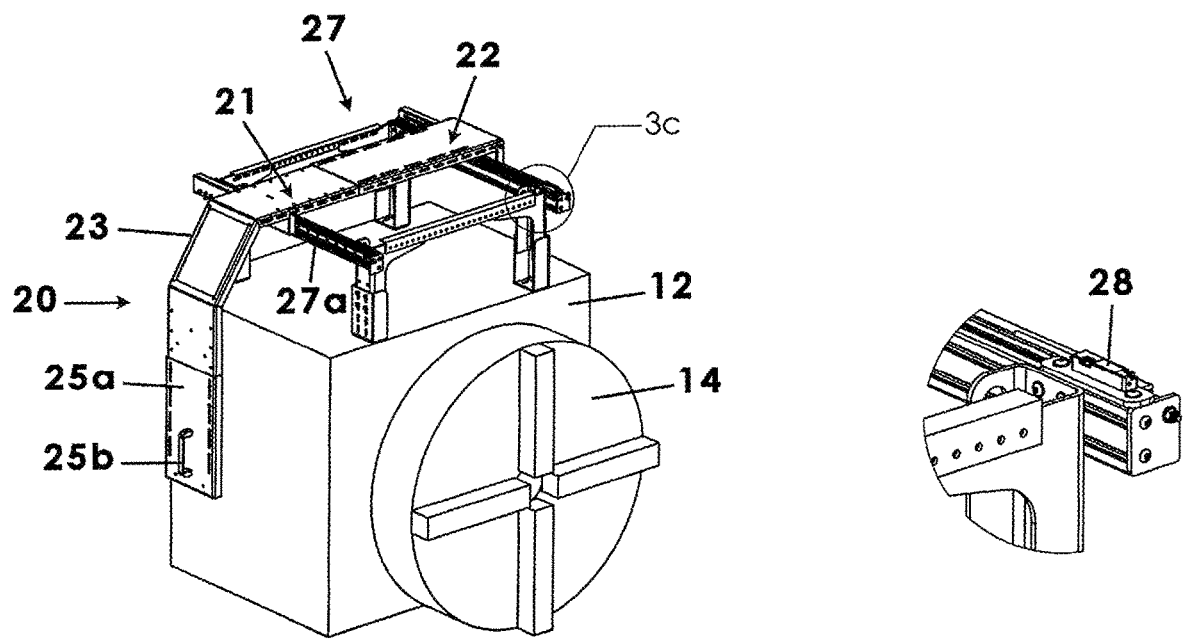
Fig. 3b
Fig. 3c

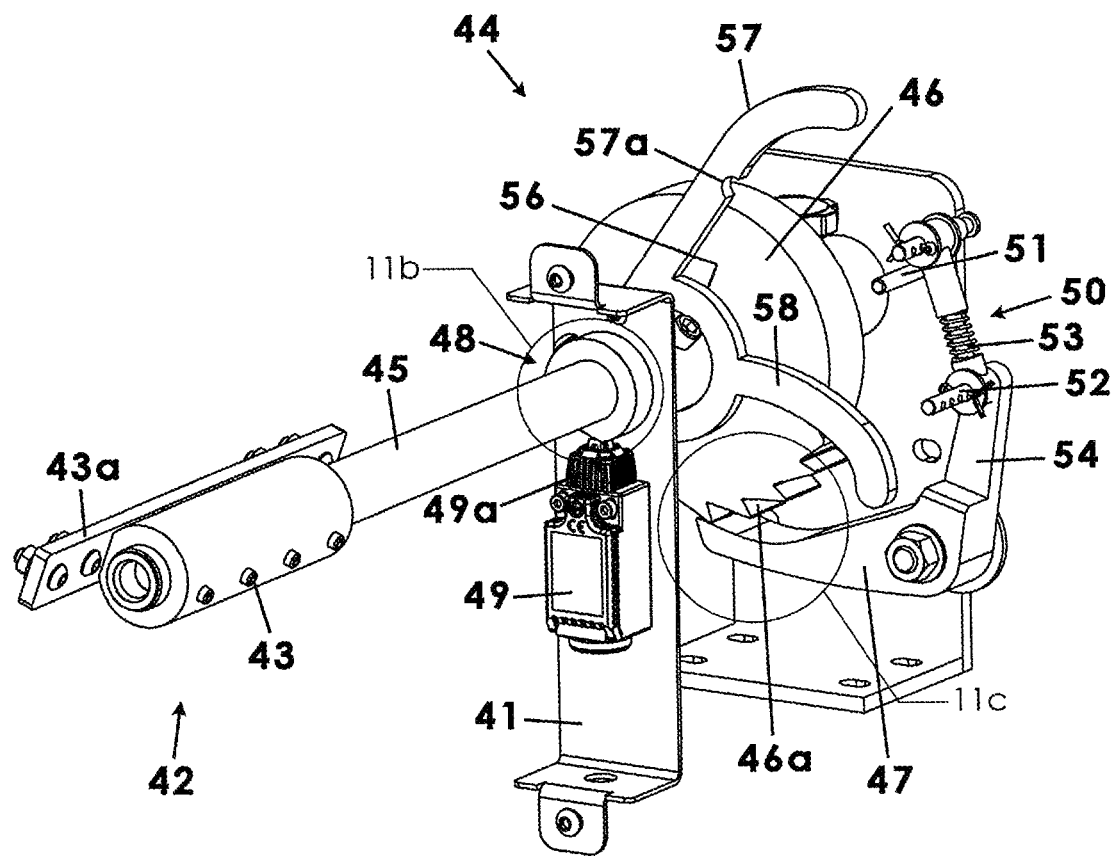
Fig. 11a
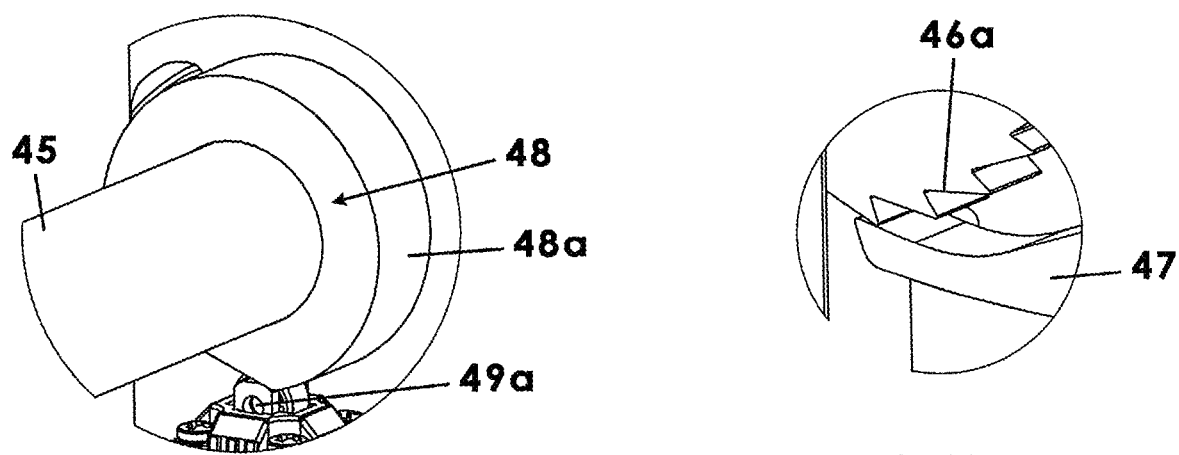
Fig. 11b
Fig. 11c

US 11,904,392 B1

RATCHETING ANTI-LOCK CHUCK GUARD FOR LATHE

BACKGROUND OF THE INVENTION

This invention relates generally to lathe guards and, more particularly, an adjustable chuck guard for attachment to a lathe and that includes a ratcheting anti-kickback assembly that, when rotated to a predetermined angle, provides authorized access to the chuck. It will be seen that the ratcheting anti-lock chuck guard provides critical safety to operation of the chuck and, generally, to a lathe.

A lathe is a machine tool widely used in various industries for shaping and cutting materials (such as metal, wood, plastic, and the like). By definition, a chuck is a spindle-mounted mechanism that holds a drill bit or similar cutting instrument. Unfortunately, a lathe poses inherent risks to operators due to its rotating components and cutting tools. In general, implementing appropriate lathe guards, workplace hazards can be minimized, reducing the likelihood of accidents, injuries, and occupational health risks. More particularly, a chuck guard protects a user from specific dangers caused by a rotating chuck. A drill chuck may be keyed, keyless, or hybrid so as to be rapidly adjustable or interchangeable. In other words, a chuck guard is a safety device specifically designed for lathe machines. It is a protective enclosure or barrier that surrounds the chuck area, which is a critical component of the ways used to secure the workpiece. The chuck guard serves as a physical barrier between the operator and the rotating chuck, reducing the risk of accidents, injuries, and entanglement during lathe operations.

A chuck guard is critically important for several reasons. Namely, a chuck guard can prevent entanglement with a user's clothing. For instance, a rotating chuck poses a significant entanglement hazard to a user who may be wearing loose clothing, jewelry, or even long hair that can get caught in the rotating chuck leading to severe injuries or even fatal accidents. A properly installed chuck guard accident barrier minimizes the risk of accidents. Even more importantly, a chuck guard can prevent an operator from reaching out and accidentally touching a rotating chuck.

Further, so-called interlocked chuck guards are equipped with safety interlocks or sensors that disable the lathe machine when the guard is opened or removed. This ensures that operators cannot access the hazardous chuck area while the machine is in operation.

Although the chuck guards described above are presumably effective for their intended purposes, existing chuck guards and lathe guards in general do not require ratcheting to a predetermined angle in order to be released and do not provide actual adjustments to the dimensions or position of the chuck guard itself.

Therefore, it would be desirable to have an adjustable chuck guard for attachment to a lathe that includes a ratcheting anti-kickback assembly that, when rotated to a predetermined angle, allows authorized access to the chuck. Further, it would be desirable to have an adjustable chuck guard that may be length, width, and height adjustable.

SUMMARY OF THE INVENTION

A ratcheting anti-lock chuck guard apparatus for selectively restricting access to a chuck associated with a lathe includes a guard assembly having a main body section positioned proximate the chuck and having an actuation section pivotally coupled to the main body section. The chuck guard apparatus includes an access assembly having a mounting shaft coupled to a distal end of the actuation section and a ratcheting assembly coupled to the shaft, the ratcheting assembly being rotatably movable to predetermined angular positions when urged by actuation of the guard assembly. It is understood that the guard assembly is rotated to an open configuration as the mounting shaft and ratcheting assembly is rotated. Further, the ratcheting assembly includes a serrated lock wheel coupled to the mounting shaft and that includes a plurality of teeth each defining a lock pocket and includes a lock pawl configured to communicate with the lock pockets as the ratcheting assembly is incrementally operated. Accordingly, the guard assembly is incrementally opened via operation of the ratcheting assembly.

Therefore, a general object of this invention is to provide an adjustable chuck guard for attachment to a lathe that includes a ratcheting anti-kickback assembly for regulating authorized access to the chuck.

Another object of this invention is to provide an adjustable lathe chuck guard, as aforesaid, in which a ratcheting arm must be rotated to a predetermined angle in order to release and provide access to a lathe chuck.

Still another object of this invention is to provide a lathe chuck guard, as aforesaid, that includes movable components so as to adjust the width or height of the lathe chuck guard itself.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a right-side perspective view of the ratcheting lathe chuck guard as in FIG. 1a;

FIG. 2b is a right-side perspective view of the ratcheting lathe chuck guard as in FIG. 2a;

FIG. 3a is a perspective view of the ratcheting lathe chuck guard according to the present invention, illustrated mounted atop a rail framework and forward configuration;

FIG. 3b is another perspective view of the ratcheting lathe chuck guard as in FIG. 3a, illustrated in a rearward configuration;

FIG. 3c is an isolated view on an enlarged scale taken from FIG. 3b;

FIG. 7 is an exploded view of the guard assembly as in FIG. 6a;

FIG. 9b is a sectional view taken along line 9b-9b of FIG. 9a;

FIG. 10b is an isolated view on an enlarged scale taken from FIG. 10a;

FIG. 11a is another perspective view of the ratcheting assembly as in FIG. 8, illustrated to show the safety switch and safety switch cam;

FIG. 11b is an isolated view on an enlarged scale taken from FIG. 11a;

FIG. 11c is an isolated view on an enlarged scale taken from FIG. 11a, illustrating initial engagement of the drive wheel teeth;

FIG. 12b is an isolated view on an enlarged scale taken from FIG. 12a;

FIG. 13b is an isolated view on an enlarged scale taken from FIG. 13a;

FIG. 14b is an isolated view on an enlarged scale taken from FIG. 14a;

FIG. 15b is an isolated view on an enlarged scale taken from FIG. 15a;

FIG. 16b is an isolated view on an enlarged scale taken from FIG. 16a.

DESCRIPTION OF THE PREFERRED EMBODIMENT

Figure 1A:
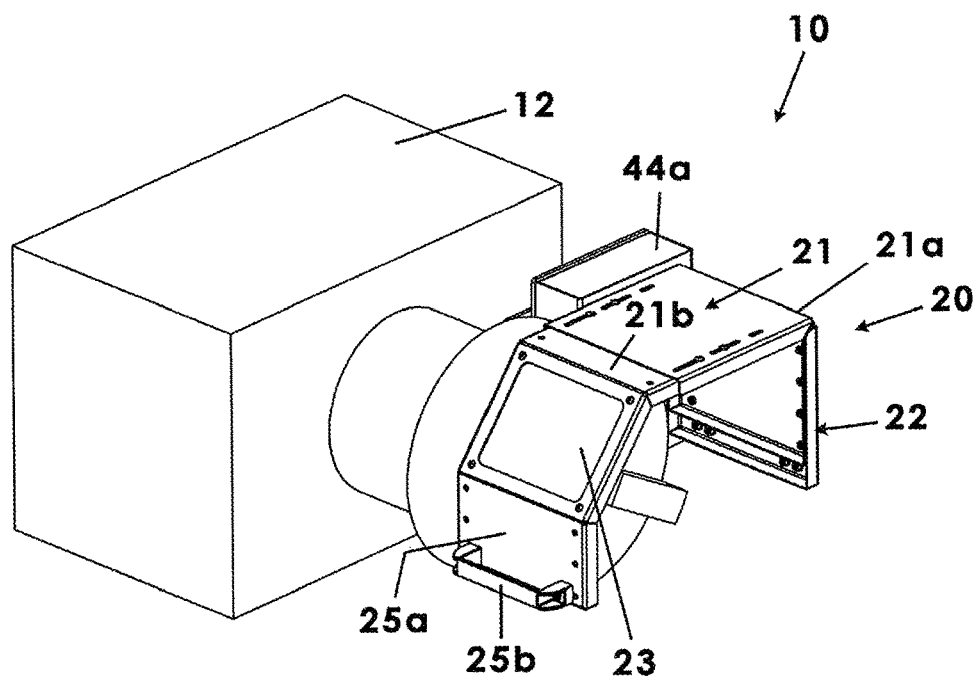
FIG. 1a is a left-angle perspective view of a ratcheting lathe chuck guard according to an embodiment of the present invention, illustrated in a closed and retracted configuration.

A ratcheting anti-lock chuck guard apparatus according to a preferred embodiment of the present invention will now be described with reference to the accompanying drawings. The ratcheting anti-lock chuck guard apparatus 10 for use with a lathe 12 and, specifically, a lathe of a type having a rotatable chuck 14 includes a guard assembly 20, an access assembly 40 that includes a mounting member 42 and ratcheting assembly 44 that cooperatively prevents the lathe 12 from operating until the guard assembly 20 has been opened and displaced a predetermined distance/angle from the chuck 14 via actuation of the ratcheting assembly 44.

Figure 1B:
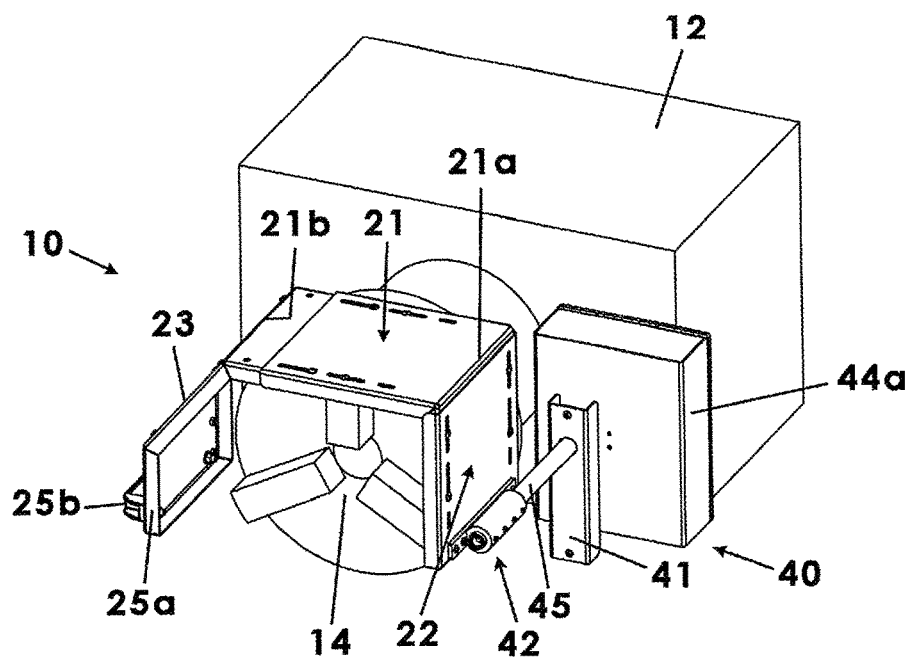
Figure 2A:
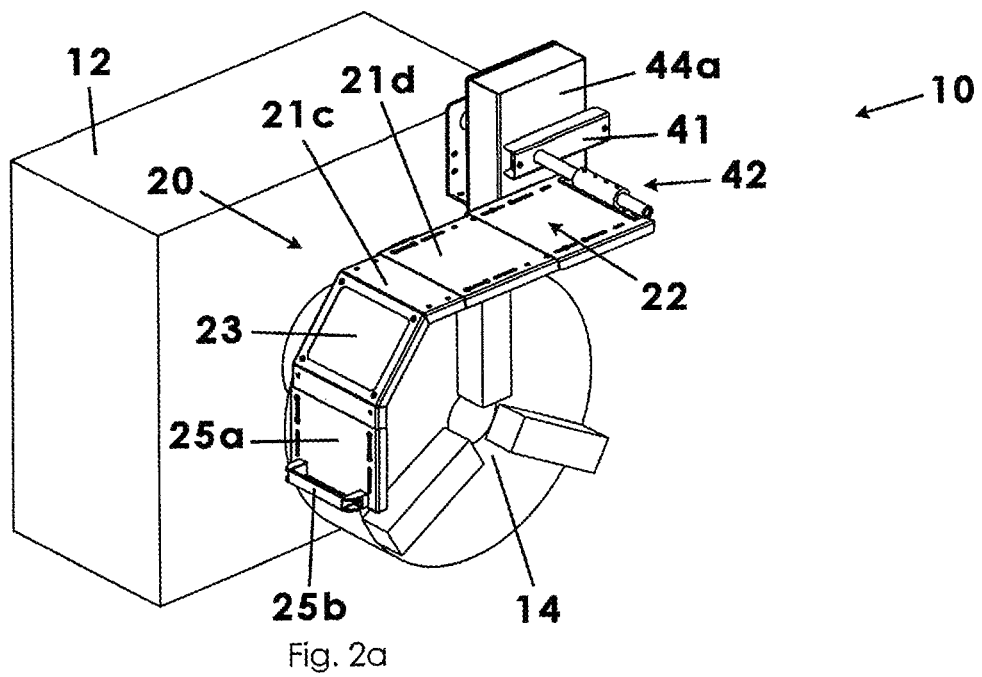
FIG. 2a is a left-angle perspective view of a ratcheting lathe chuck guard according to the present invention, illustrated in a horizontally mounted and laterally extended configuration.
Figure 2B:
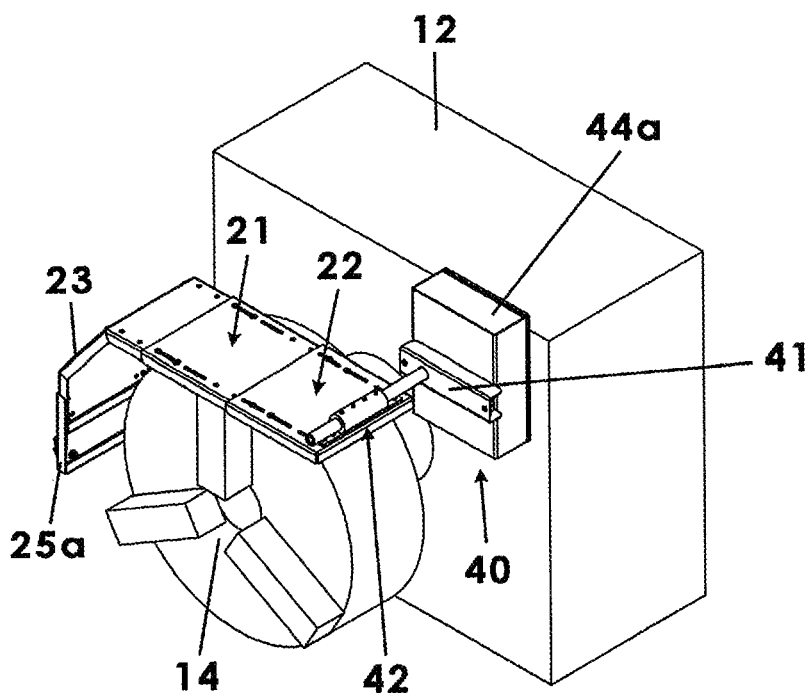
Figure 4A:
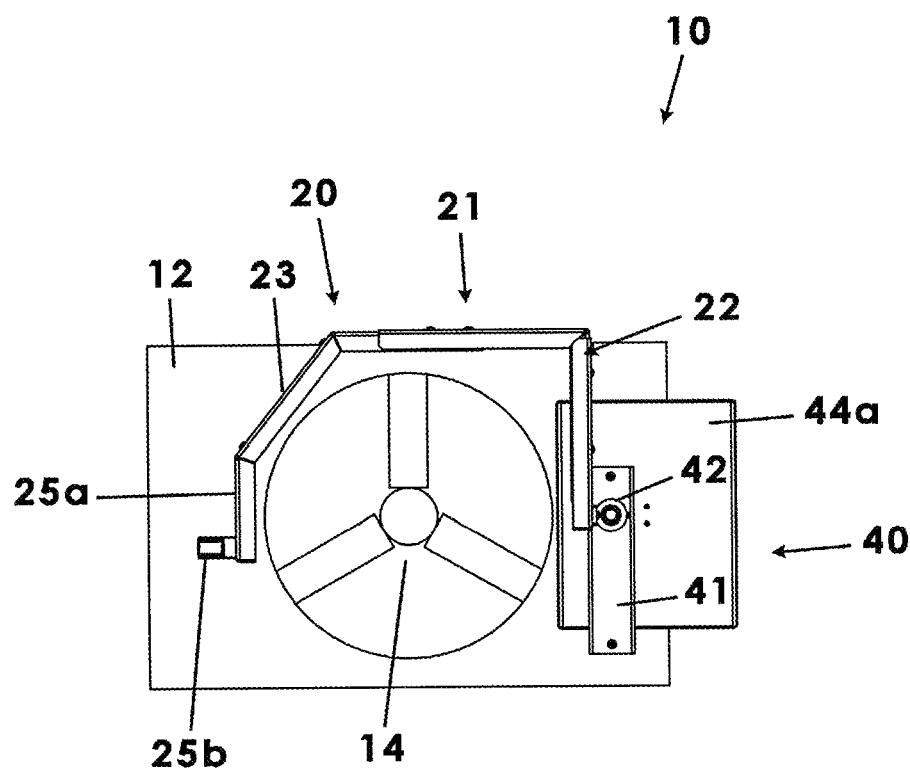
FIG. 4a is a front view of the ratcheting lathe chuck guard as in FIG. 1a, illustrated with the guard assembly in a closed configuration.
Figure 4B:
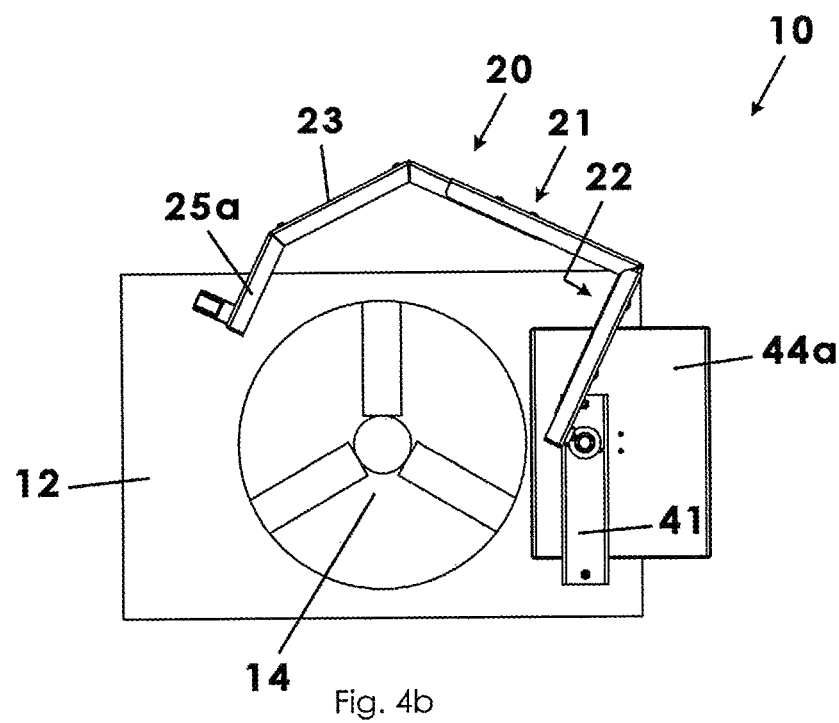
FIG. 4b is a front view of the ratcheting lathe chuck guard as in FIG. 1a, illustrated with the guard assembly in a partially open configuration.
Figure 5A:
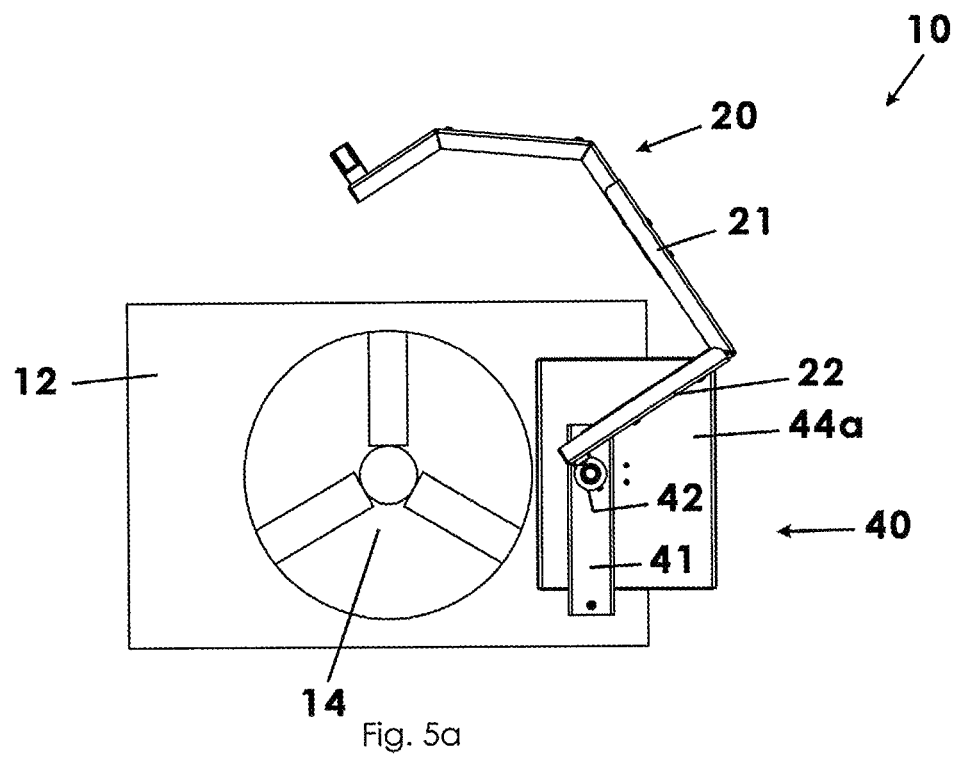
FIG. 5a is a front view of the ratcheting lathe chuck guard as in FIG. 4b, illustrated with the guard assembly in a further partially open configuration.
Figure 5B:
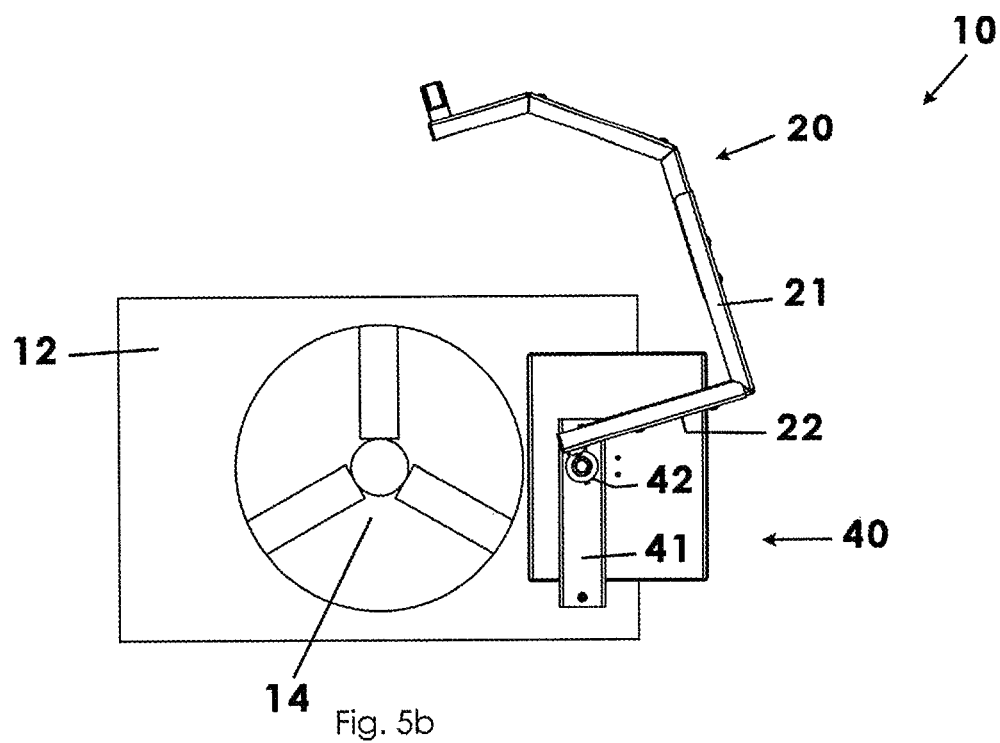
FIG. 5b is a front view of the ratcheting lathe chuck guard as in FIG. 5a, illustrated with the guard assembly in a fully open configuration.
Figure 6A:
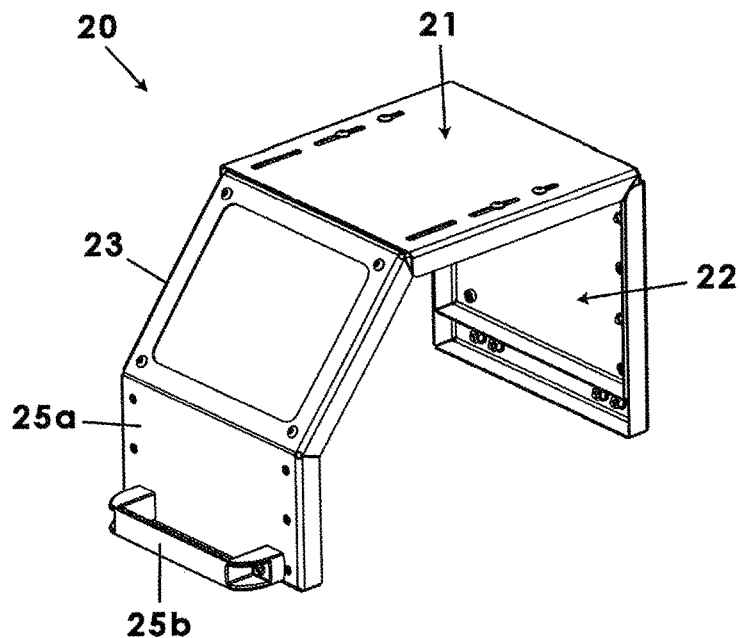
FIG. 6a is a perspective view of a guard assembly according to the present invention, illustrated in a fully retracted configuration.
Figure 6B:
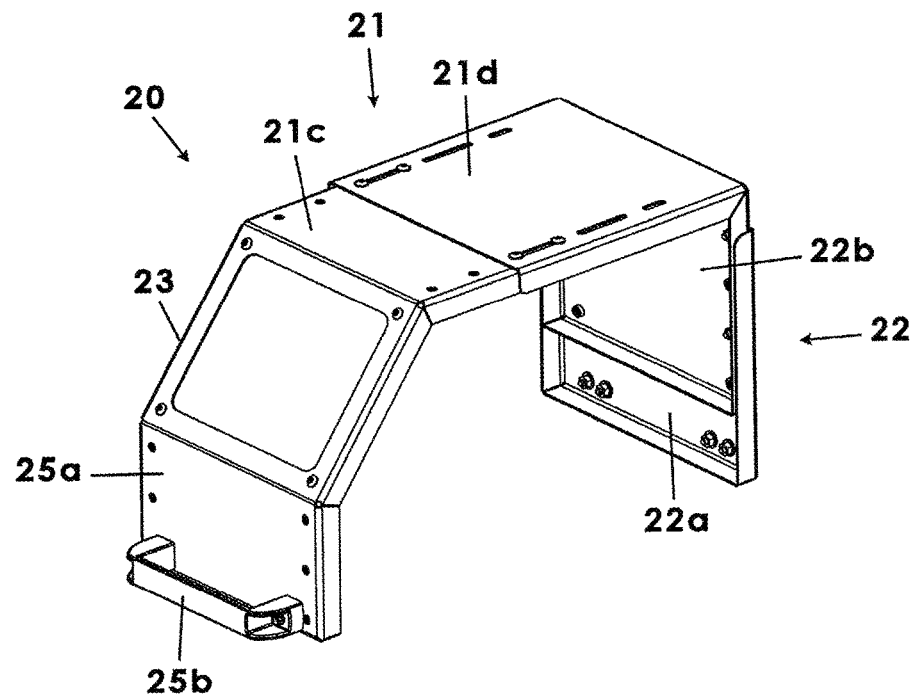
FIG. 6b is a perspective view of a guard assembly according to the present invention, illustrated in a partially extended configuration.

The guard assembly 20 may include a main body section 21 and an actuation section 22 pivotably coupled to the main body section 21. More particularly, the body section 21 and actuation section 22 may have generally planar configurations, the actuation section 22 being pivotally coupled to a first edge 21a of the body section 21. In other words, the body section 21 and actuation section 22 may, at one configuration, define a 90° angle relative to one another (FIG. 1b) or may be selectively and pivotally adjusted to a planar or end-to-end configuration (FIG. 2a). When articulated to the planar or flat configuration, the main body section 21 is effectively lengthened. Further, the pivotal coupling between the main body section 21 and actuation section 22 allows the access assembly 40 to be mounted in either a vertical orientation (FIG. 1b) or a horizontal orientation (FIG. 2b). Such variations in the mounting capabilities of the access assembly 40 are important in that all lathes 12 may not have uniform configurations or dimensions and a selected orientation may be appropriate based upon whether the actuation section 22 is positioned at a right angle versus end-two-end as described above.

Figure 7:
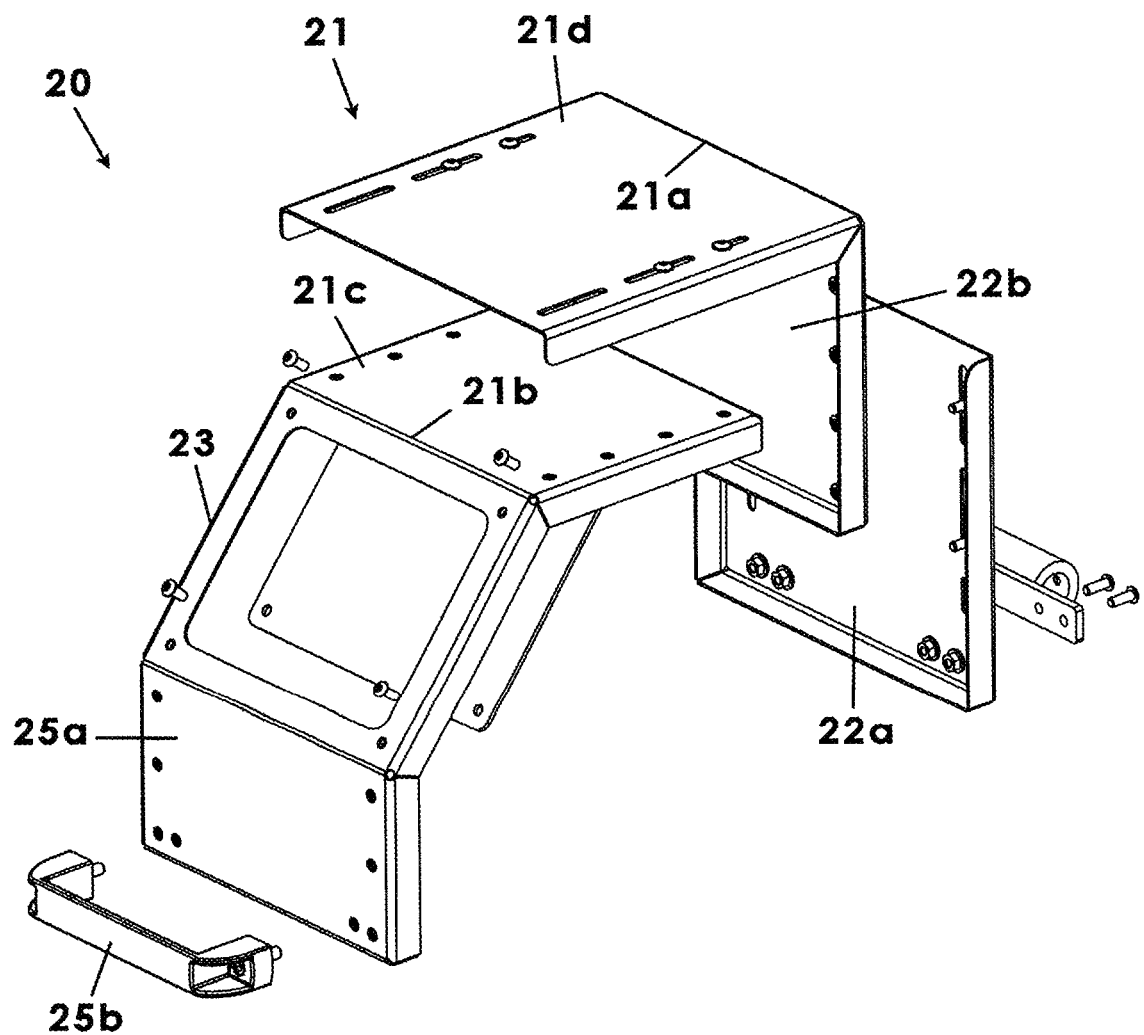

Similarly, it will be understood that the main body section 21 and actuation section 22 may be length adjustable (or, depending on one's angular perspective, may be width-adjustable). More particularly, the main body section 21 may include a first portion 21c and a second portion 21d that is slidably coupled to the first portion 21c, such as with complementary bolts and bolt holes, respectively, or similar fasteners that would allow incremental length adjustments as desired or needed by user in order that they adequately cover the chuck 14 of the lathe 12 (FIG. 7). Similarly, the actuation section 22 may include a first portion 22a and a second portion 22b that is slidably coupled to the first portion 22a, such as with complementary bolts and bolt holes, respectively.

The guard assembly 20 may include additional components. Namely, the guard assembly 20 may include a visibility panel 23 coupled to a second edge 21b of the main body section 21. In an embodiment, the visibility panel 23 extends outwardly and downwardly at an offset angle relative to the main body section 21 (FIG. 1a). Preferably, the visibility panel 23, has a transparent construction through which the chuck 14 (that is being guarded) is viewable by a user. The structure is advantageous in that it enables a user to determine what accessory may currently be connected to the chuck 14 without actually opening the entire guard assembly as will be described later.

Further, the guard assembly 20 may include a handle assembly having a handle plate that may be length adjustable in a manner such as was described previously. The handle plate 25a is shown in its lengthened position in FIG. 3b. Preferably, a handle 25b may be fixedly mounted to the handle plate 25a and may be grasped by a user as a means for lifting and opening the guard assembly 20 in cooperation with operation of the ratcheting assembly 44 (FIG. 1b).

As shown in FIGS. 3a to 3c, the ratcheting anti-lock chuck guard apparatus 10 may include a mounting framework 27 that may be coupled to a top surface or platform of a lathe 12 and upon which the guard assembly 20 may be positioned and adjusted forwardly and rearwardly. In an embodiment, the mounting framework 27 may include a pair of rail members 27a that are laterally spaced apart and parallel to one another, each rail member 27a including a plurality of rollers or equivalent slide fasteners such that the guard assembly 20, when positioned atop the rail members 27a, is slidably movable between a forward configuration proximate the chuck 14 (also referred to as a deployed configuration) and a rearward configuration rearwardly displaced from the chuck 14 (also referred to as a stowed configuration). It is understood, of course, that the mounting framework 27 may be elevated using a plurality of vertical support legs and may include one or more struts extending between respective rail members for stability. In an embodiment, the mounting framework 27 may include a safety sensor 28 positioned proximate a front end of a respective rail member 27a, said safety sensor 28 being configured to detect the presence of the guard assembly 20 and being in electrical configuration with the lathe 12 such that the lathe 12 is rendered inoperable when the guard assembly 20 is moved to its forward configuration where it effectively guards against unintended access to the chuck 14.

In a critical aspect, the guard assembly 20 is coupled to the access assembly 40. More particularly, the actuation section 22 is coupled to the ratcheting assembly 44 of the access assembly 40 such that the guard assembly 20 including the main body section 21 is incrementally opened as the ratcheting assembly 44 is incrementally operated/rotated as shown in FIGS. 4a to 5b. It is understood that the ratcheting assembly 44 may be positioned in a protective housing 44a.

Figure 8:
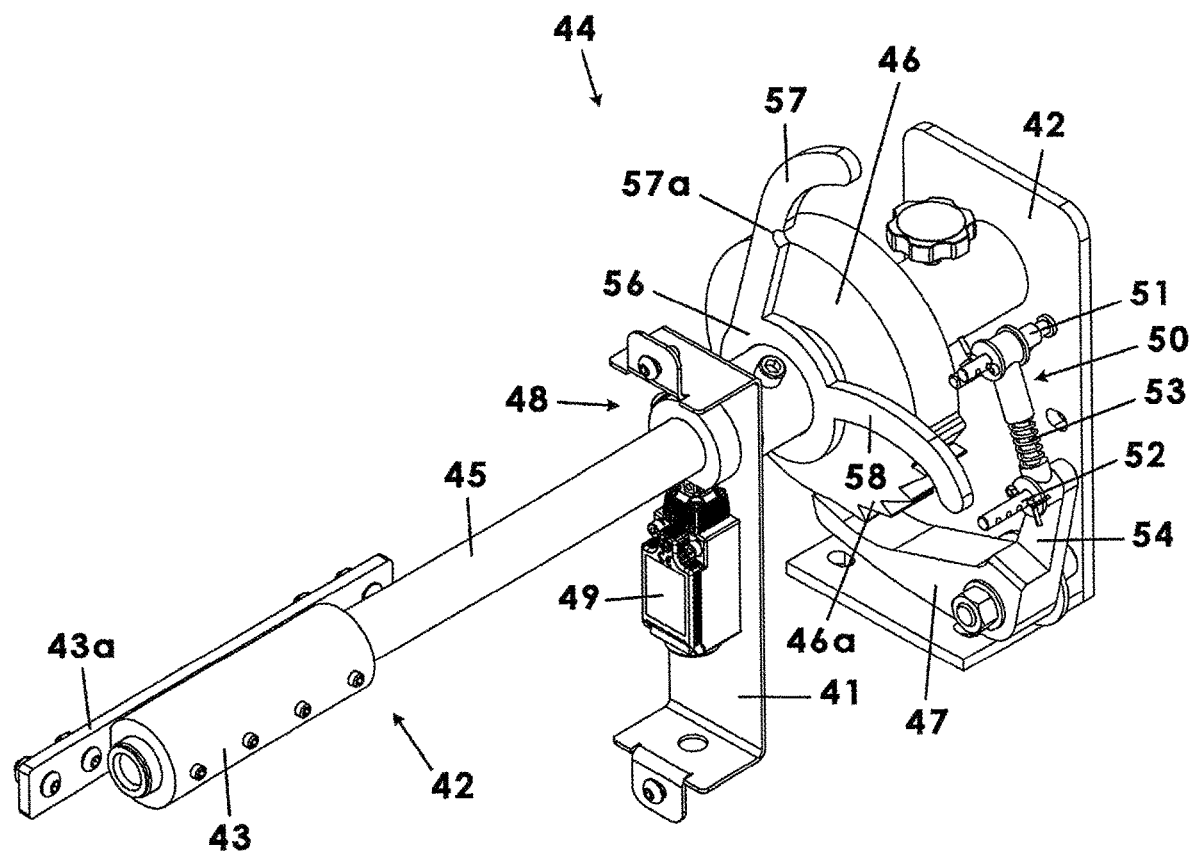
FIG. 8 is a perspective view of a ratcheting assembly according to the present invention, illustrated in a reset or unactuated configuration.
Figure 9A:
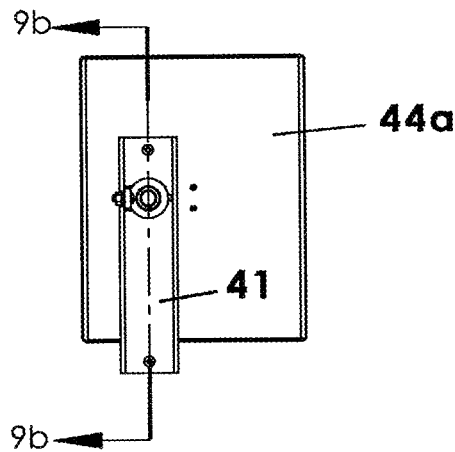
FIG. 9a is a front view of the ratcheting assembly as in FIG. 8.
Figure 9B:
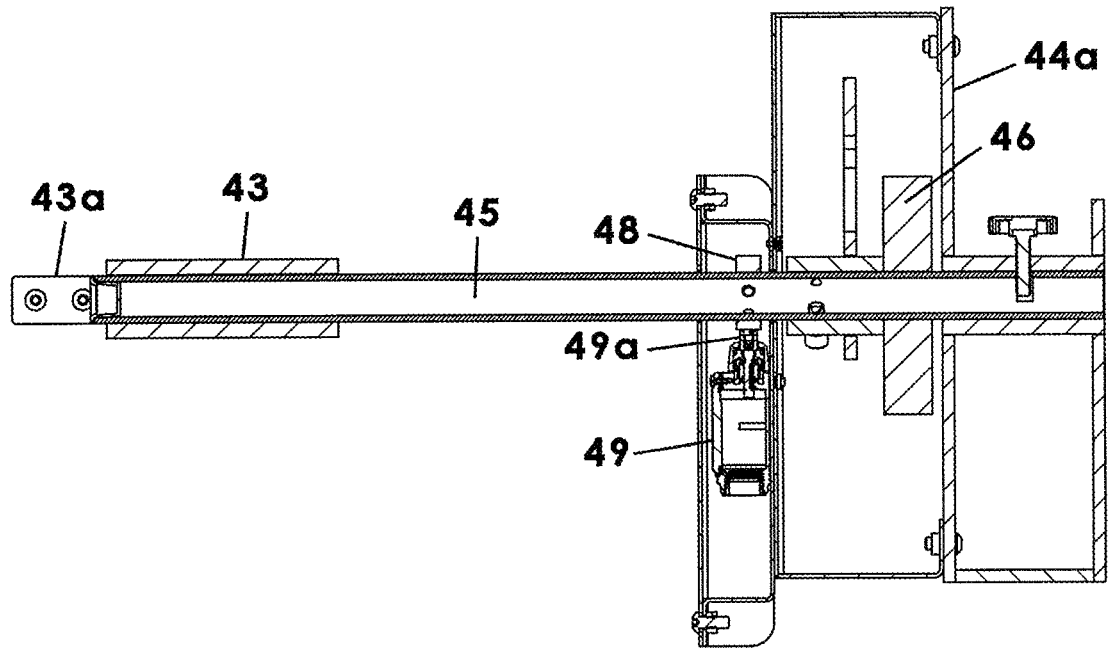
Figure 10A:
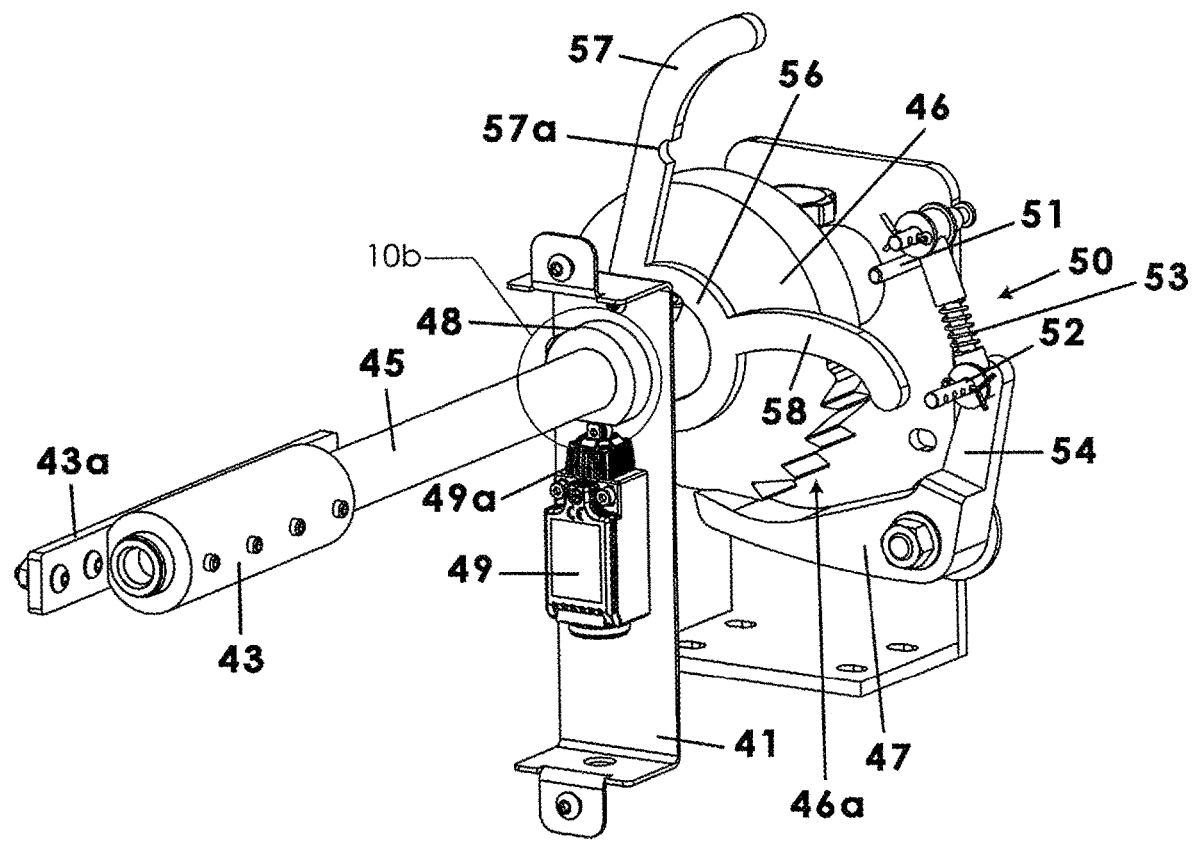
FIG. 10a is a perspective view of the ratcheting assembly as in FIG. 8, illustrated to show the safety switch and safety switch cam.
Figure 10B:
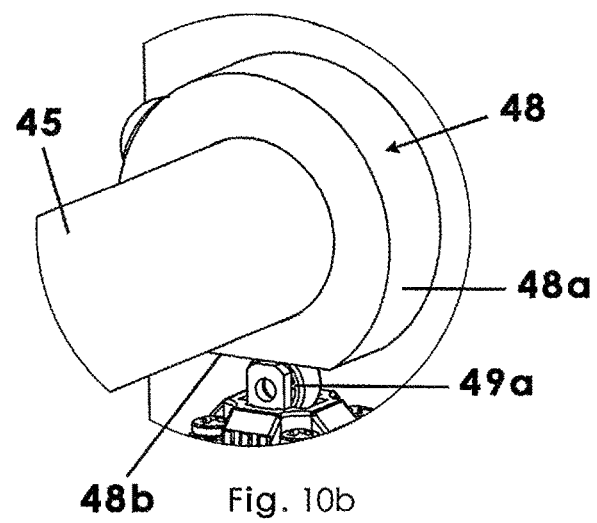
Figure 12A:
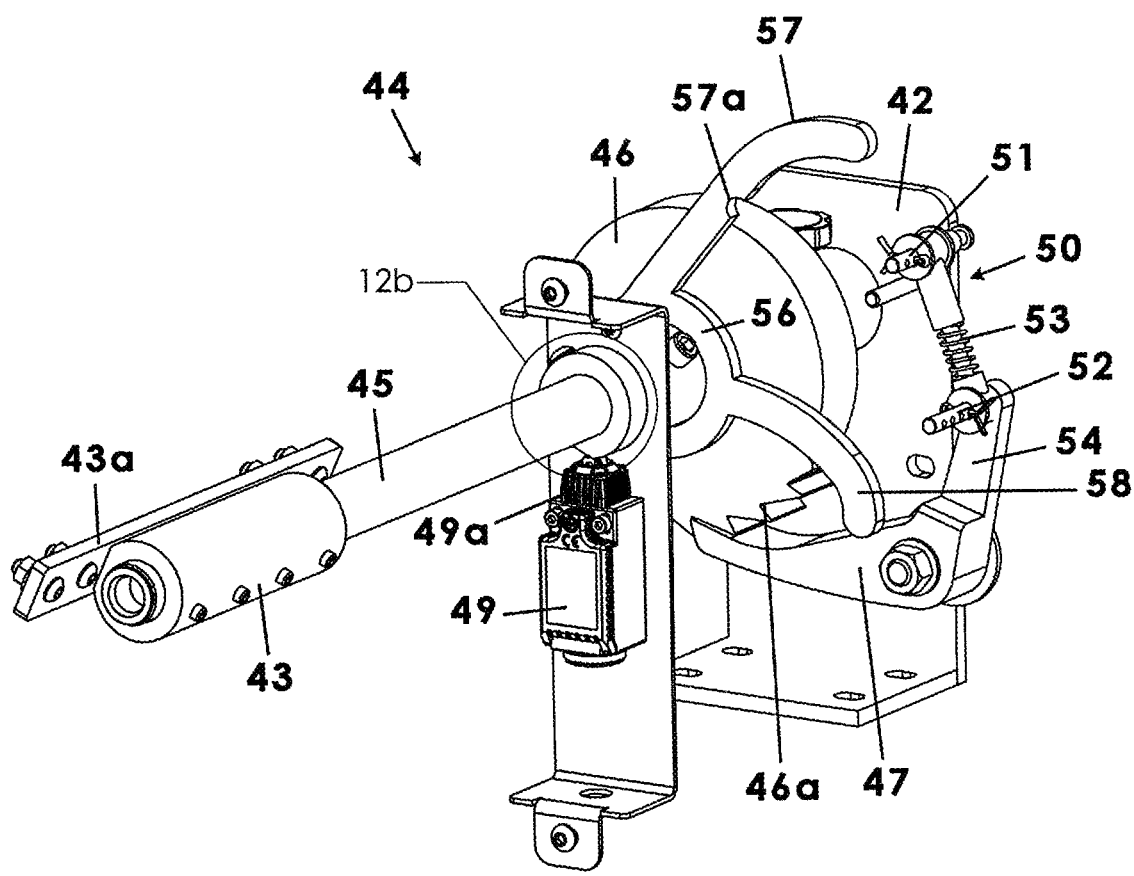
FIG. 12a is another perspective view of the ratcheting assembly as in FIG. 8, illustrated to show a further rotation and ratcheting of the assembly.
Figure 12B:
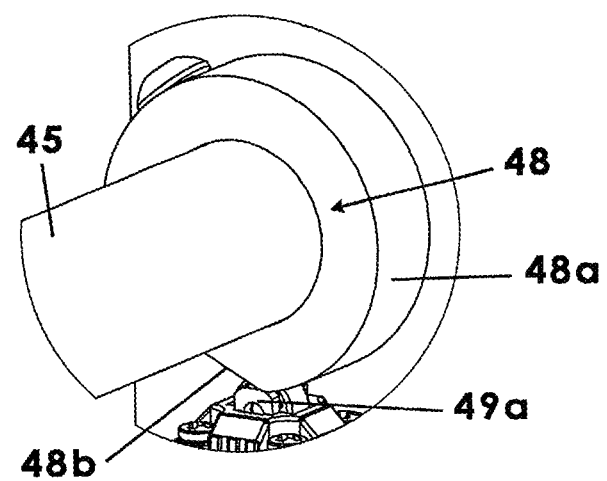
Figure 13A:
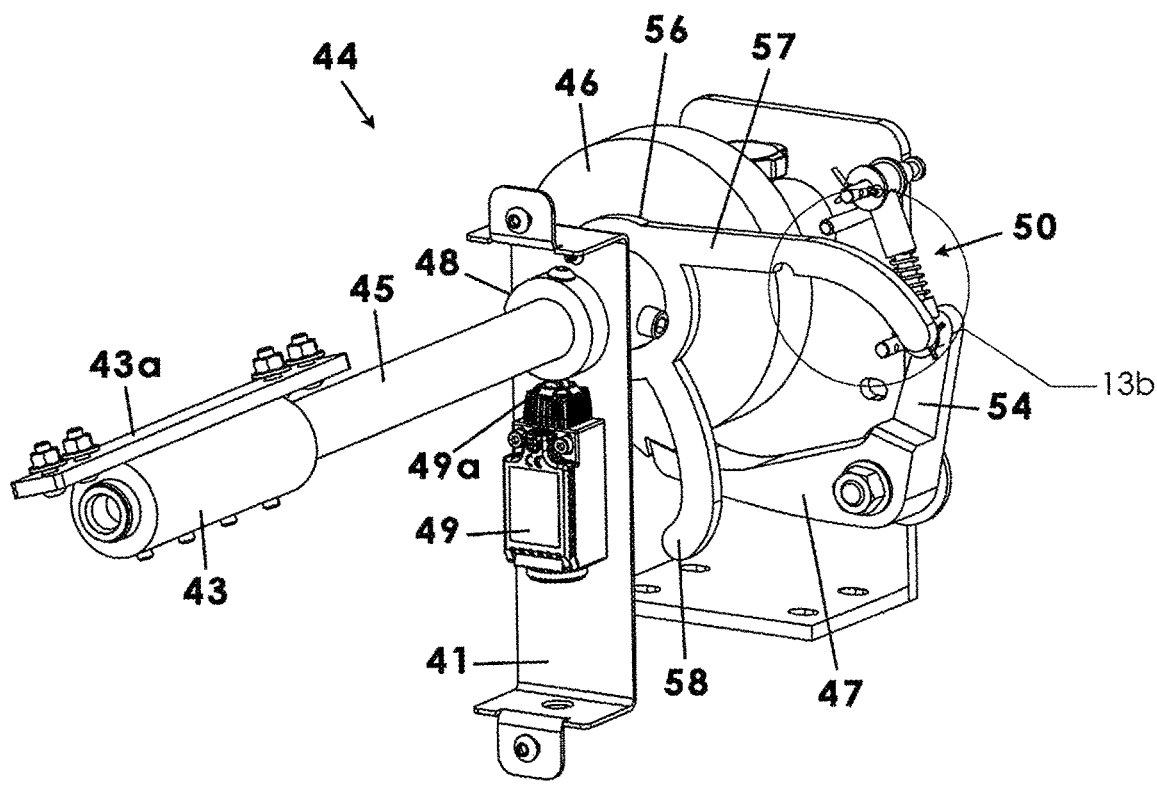
FIG. 13a is another perspective view of the ratcheting assembly as in FIG. 8, illustrated to show a further rotation and ratcheting of the assembly.
Figure 13B:
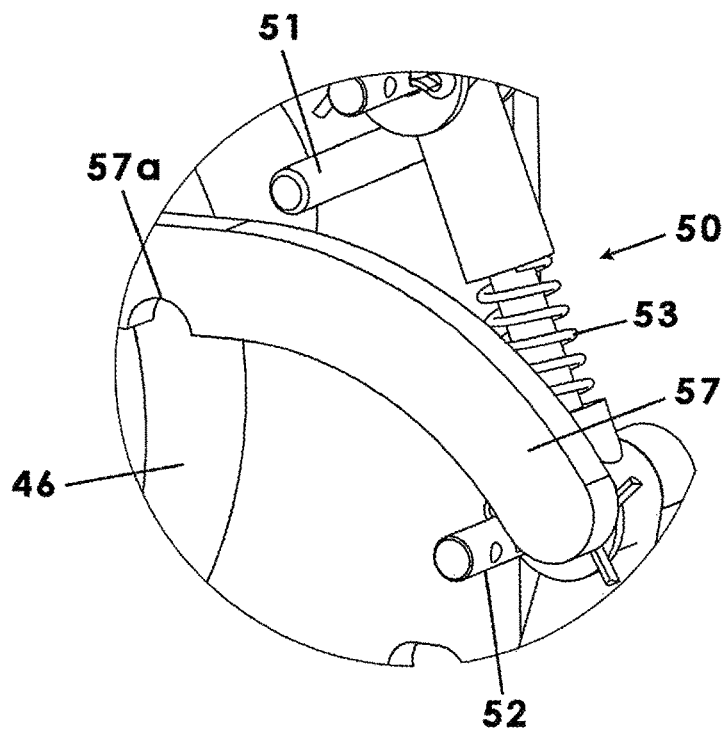

Describing the invention generally, the access assembly 40 includes a mounting member 42 that is coupled to a free end of the guard assembly 20. In more detail and as shown in FIG. 8, the mounting member 42 may include a guard mount 43 having a cylindrical portion and an interface 43a having a planar configuration coupled to a free edge of the actuation section 22 of the guard assembly 20. Further, the mounting member 42 includes a guard shaft coupled at one end to the guard mount 43 and extending rearwardly into communication with the ratcheting assembly 44.

As shown in FIG. 8, the ratcheting assembly 44 may include a serrated lock wheel 46 coupled to an end of the guard shaft 45 so as to rotate in proportion to rotation of the guard shaft. In an embodiment, the serrated lock wheel 46 has or defines a plurality of teeth 46a with each tooth defining a tooth pocket. The ratcheting assembly 44 may include a lock wheel pawl 47 positioned proximate the serrated lock wheel 46 and that is configured to be received in respective two pockets; however, the lock wheel pawl 47 is not physically coupled to the serrated lock wheel 46 as will be apparent from the description below. In other words, the lock wheel pawl 47 is sometimes nested in respective two pockets but, in other occasions, displaced therefrom. As will be seen, the position of the lock wheel pawl 47 is regulated by respective rotation of the guard shaft 45 and interactions of other components of the ratcheting assembly 44 is explained below.

In a critical aspect, the ratcheting assembly 44 includes a safety switch cam 48 that is coupled to and configured to encircle the guard shaft 45, the safety switch cam 48 having a curved portion 48a (i.e., an outer edge that has a curved surface circumferentially in the nature of a wheel) and a flat portion 48b that briefly interrupts and is positioned along the curved portion 48a. Further, the ratcheting assembly 44 includes a safety switch 49 having roller plunger 49a in physical communication with the safety switch cam 48 and that is movable between a compressed configuration and a deployed or released configuration extending outwardly. In an embodiment, the roller plunger 49a is compressed inwardly toward a switch housing by its contact with the curved portion 48a of the safety switch cam 48 and is biased to extend outwardly, e.g., to pop out, when the roller plunger 49a is positioned or nested along the flat portion 48b of the safety switch cam 48. Further, the safety switch 49 is electrically configured to prevent operation of the lathe 12 when the roller plunger 49a is deployed (i.e., when the roller plunger 49a is aligned with the flat portion 48b) and to allow operation of the lathe 12 when the roller plunger 49a is compressed (i.e., by contact with the curved portion 48a of the safety switch cam 48). As will be seen in the drawings and described below, the flat portion 48b of the safety switch cam 48 will be rotated into alignment with the roller plunger 49a at a time when the lock wheel pawl 47 is not in contact with the plurality of teeth or respective tooth pockets. In short, there is a specific configuration that enables the lathe 12 to operate and a specific configuration that prevents or locks out operation of the lathe 12. The cam and safety switch structures may be mounted in a protective casing 41 (FIG. 1b).

Figure 14A:
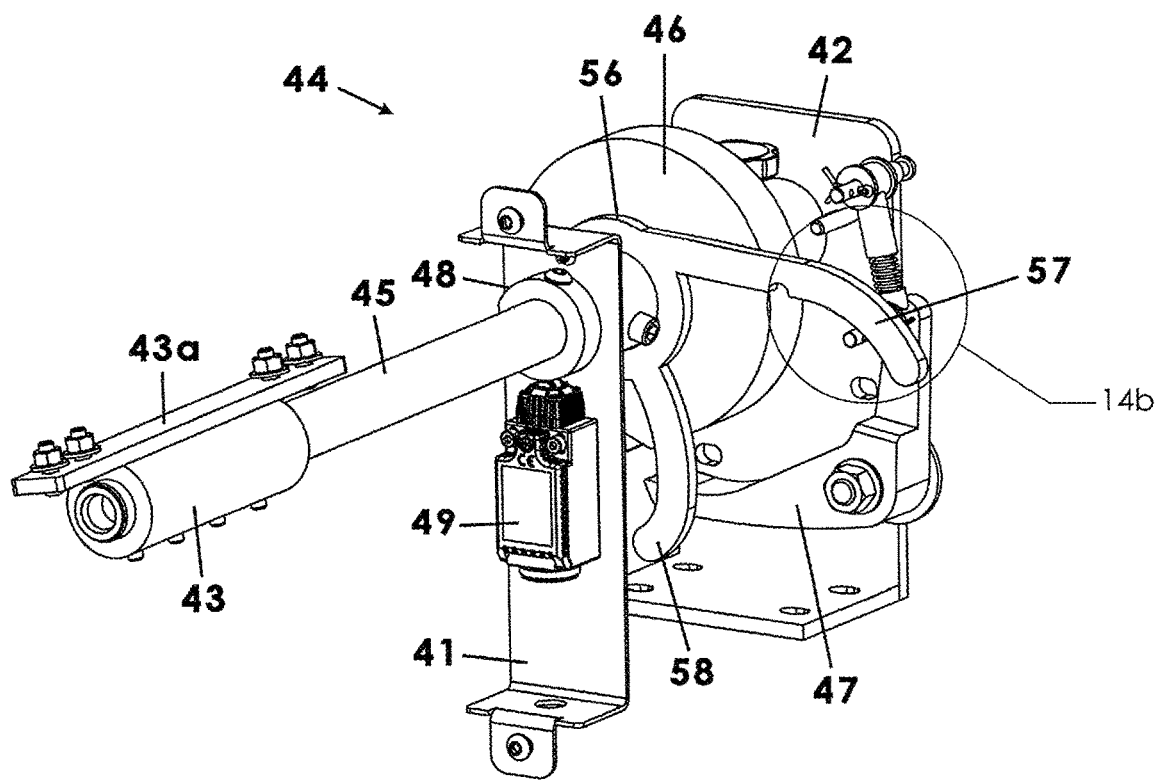
FIG. 14a is another perspective view of the ratcheting assembly as in FIG. 8, illustrated to show operation of a pawl over-center arm.
Figure 14B:
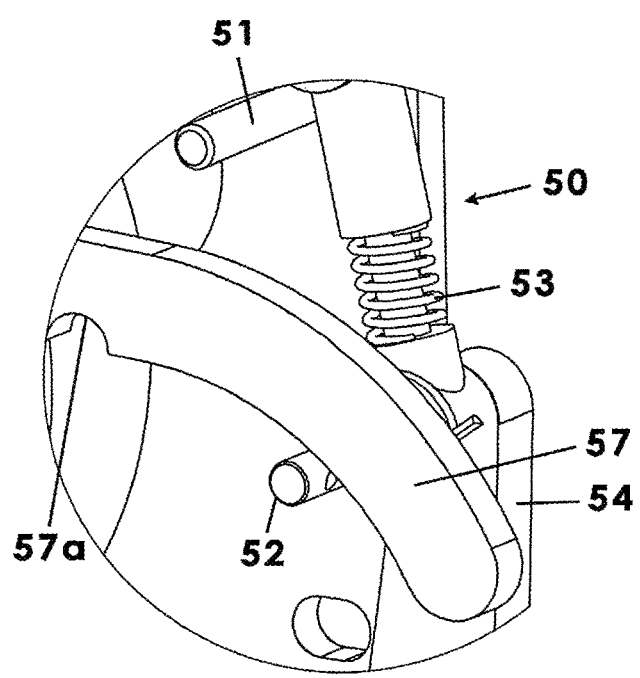

The ratcheting assembly 40 includes multiple additional components that, when properly sized, timed, and configured, enable operation of the ratcheting assembly including resetting the serrated lock wheel 36 and lock wheel pawl 47. More particularly, the ratcheting assembly 40 includes a pawl tensioning assembly 50 having a pawl tensioner pivot pin 51 that includes a generally linear configuration that defines a pivot axis. The pawl tensioner pivot pin 51 may be coupled to a frame member that encloses the entire ratcheting assembly 44 or to another support member. Further, the pawl tensioning assembly 50 includes a pawl tensioner mount pin 52 that is parallel to and displaced from the pawl tensioner pivot pin 51. Still further, the pawl tensioning assembly 50 includes a lock wheel pawl tensioner that may include a spring 53 (such as a compression spring) coupled at respective ends so as to extend between the pawl tensioner pivot pin 51 and the pawl tensioner mount pin 52. To function appropriately, this pawl tensioning assembly 50 must be coupled to the lock wheel pawl 47. As best shown in FIGS. 14a and 14b, the lock wheel pawl 47 includes an upper arm 54 that is coupled to the pawl tensioner mount pin 52.

Figure 15A:
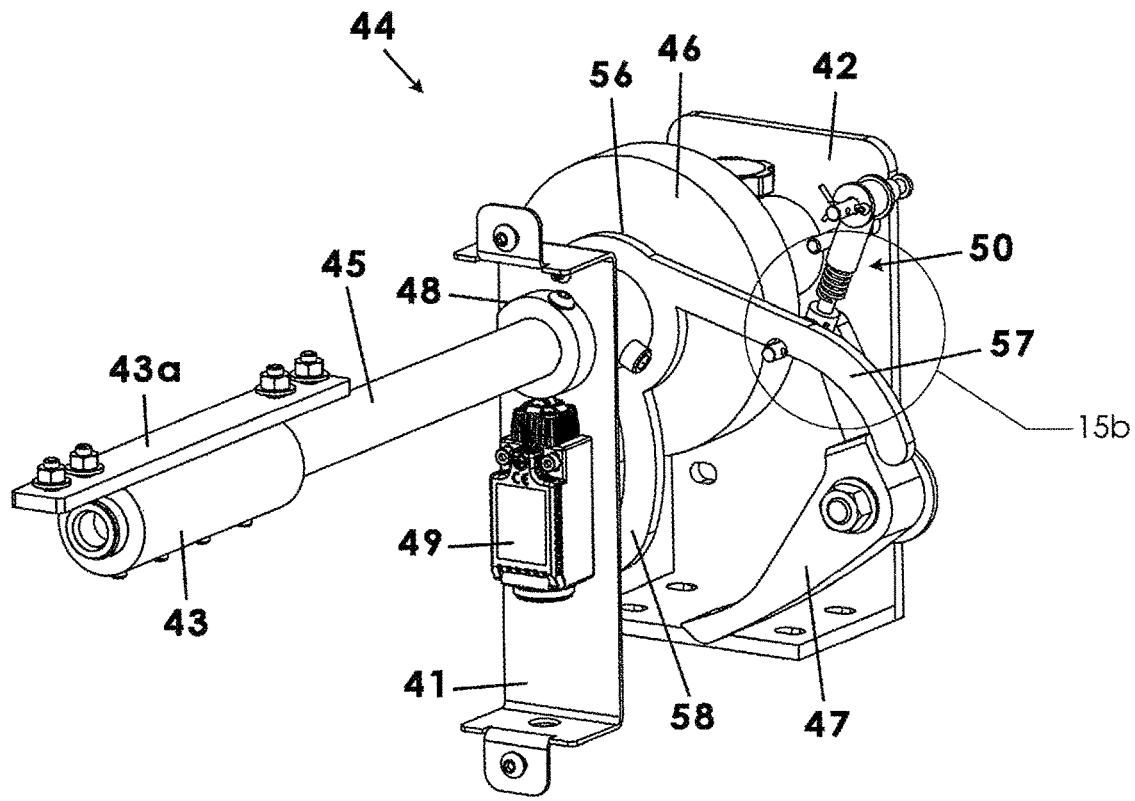
FIG. 15a is another perspective view of the ratcheting assembly as in FIG. 14a, illustrated to show a further operation of a tensioner assembly.
Figure 15B:
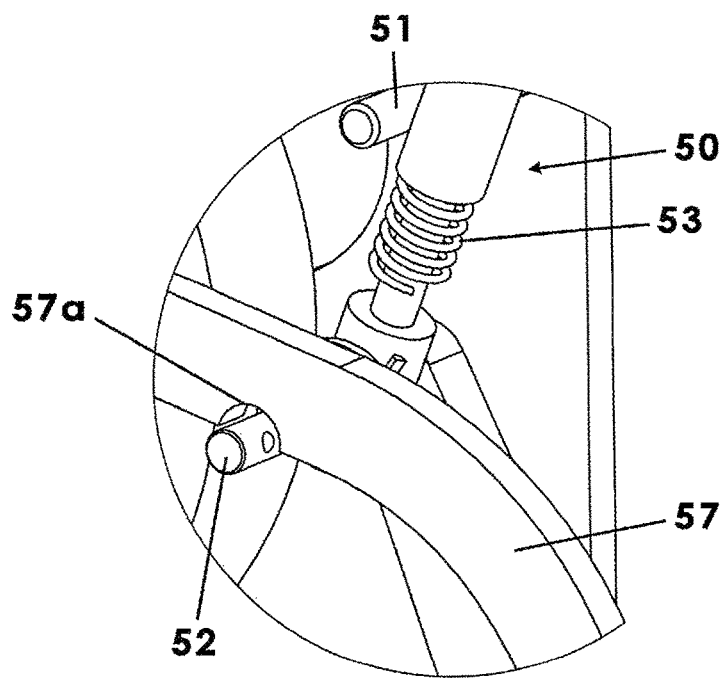

In another aspect, the ratcheting assembly 40 includes a structure that enables a resetting of the ratcheting members. In an embodiment, the ratcheting assembly 40 includes a collar 56 mounted to the guard shaft 45 so as to rotate therewith, the collar 56 includes a pawl over-center arm 57 and a pawl reset arm 58, both of which are configured to interact with the pawl tensioning assembly 50 and the lock wheel pawl 47, respectively, when the guard shaft 45 is rotated a predetermined amount. More particularly, the pawl over-center arm 57 defines a notch 57a or cutout that is positioned to mate with and received the pawl tensioner mount pin when the guard shaft 47 is sufficiently rotated that the lock wheel pawl 47 has passed beyond a last tooth pocket defined by the plurality of teeth 46a (FIGS. 14b and 15b). In other words, the interaction described in this paragraph occurs after the guard assembly 20 has been raised and the ratcheting assembly 40 has been systematically moved through its partially rotated configurations. It is understood that the illustration in FIG. 15 corresponds to the guard assembly 20 being raised as high as possible which holds the lock wheel pawl 47 disengaged from the serrated locking wheel 46.

Figure 16A:
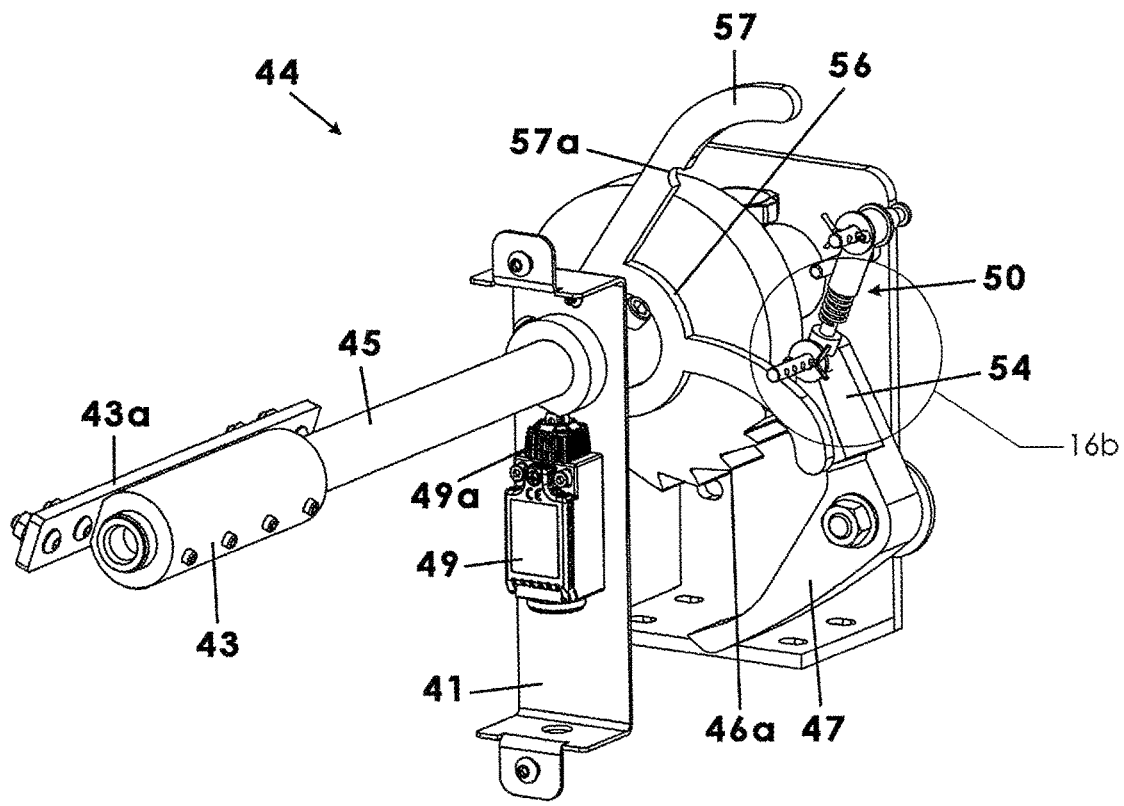
FIG. 16a is another perspective view of the ratcheting assembly as in FIG. 8, illustrated to show a resetting of the assembly.
Figure 16B:
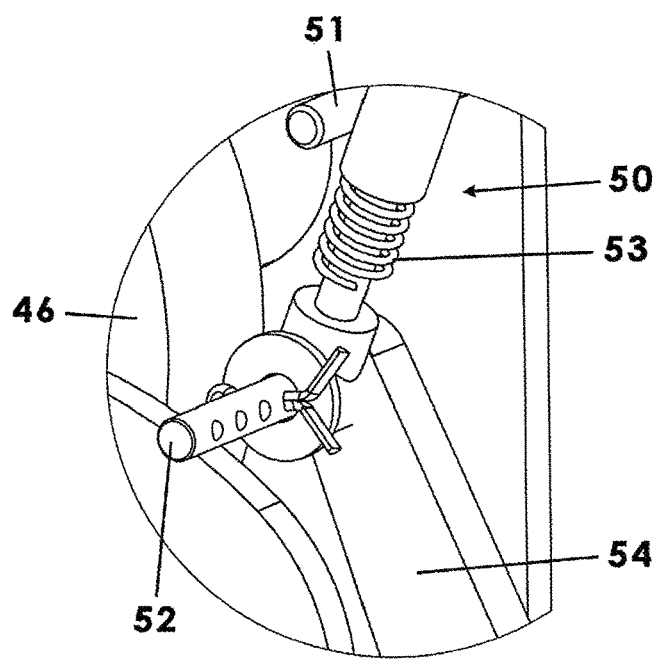

Further, the pawl reset arm 58 is positioned and configured to push the pawl tensioner mount pin 52 upwardly when the guard shaft 45 is rotated another predetermined amount such that the plurality of teeth 46a is completely displaced from the lock wheel pawl 47 (FIGS. 16a and 16b). It is understood that in this position, the pawl tensioner remains in its standard position which keeps the serrated locking wheel 46 in position and the pawl reset arm 58 pushes up the tensioner pin so as to force it back over center and to unlock the locking pawl 47. In other words, a further rotation of the shaft will return the lock wheel pawl 47 to its initial or operational position.

In use, the guard assembly 20 is configured to prevent accidental and unintentional contact with the chuck 14 area of a lathe machine 12. The operation of the lathe 12 is locked out until the guard assembly 20 has been raised via operation of a ratcheting assembly 42 a predetermined angle, i.e., to a complete open configuration. Multiple safety switches are disclosed for presenting a failsafe safety solution to lathe operations, namely, operation of the lathe and chuck are locked out when said safety switches are actuated. Further, structures have been disclosed showing how the guard assembly may be adjusted in 3 dimensions, i.e., forwardly/rearwardly, upwardly/downwardly, and laterally.

It is understood that while certain forms of this invention have been illustrated and described, it is not limited thereto except insofar as such limitations are included in the following claims and allowable functional equivalents thereof.

The invention claimed is:

1. A ratcheting anti-lock chuck guard apparatus for selectively restricting access to a chuck associated with a lathe, said chuck guard apparatus comprising:
 a guard assembly having a main body section positioned proximate the chuck and having an actuation section pivotally coupled to and extending away from a first edge of said main body section;
 an access assembly having a mounting member coupled to a distal end of said actuation section and a ratcheting assembly coupled to said mounting member, said ratcheting assembly being rotatably movable to predetermined angular positions when urged by actuation of said guard assembly.

2. The chuck guard apparatus as in claim 1, wherein said main body section and said actuation section are each length adjustable.

3. The chuck guard apparatus as in claim 2, wherein:
 said main body section includes a first portion and a second portion that is slidably movable relative to said first portion so as to adjust a length of said main body section; and
 said actuation section includes a first portion and a second portion that is slidably movable relative to said second portion two as to adjust a length of said actuation section.

4. The chuck guard apparatus as in claim 1, wherein said ratcheting assembly includes:
 a serrated lock wheel coupled to a proximal end of said mounting member and having a plurality of teeth each defining a lock pocket; and
 a lock wheel pawl mounted proximate said serrated lock wheel and configured to lock successively into respective lock pockets when said serrated lock wheel is rotated.

5. The chuck guard apparatus as in claim 4, wherein said mounting member includes a guard mount coupled to said actuation section of said guard assembly and a guard shaft coupled at one end to said guard mount and at another end to said serrated lock wheel wherein a rotation of said guard shaft causes a corresponding rotation of said serrated lock wheel.

6. The chuck guard apparatus as in claim 5, wherein said ratcheting assembly includes:
 a safety switch cam mounted to said guard shaft and configured to rotate therewith, said safety switch cam having a curved portion and a flat portion;
 a safety switch in electrical communication with the lathe and having a switch housing and a roller plunger in communication with said safety switch cam that is movable between a compressed configuration compressed inwardly towards said switch housing when said roller plunger is in contact with said curved portion of said safety switch cam and a deployed configuration extending outwardly away from said switch housing when said roller plunger is in contact with said flat portion of said cam;
 wherein said safety switch is electrically configured to prevent operation of said lathe when said roller plunger is in said compressed configuration and allow operation of said lathe when said roller plunger is in said deployed configuration.

7. The chuck guard apparatus as in claim 5, wherein said ratcheting assembly includes a pawl tensioning assembly comprising:
 a pawl tensioner pivot pin coupled to a frame member and that defines a pivot axis;
 a pawl tensioner mount pin that is parallel to and displaced from said pawl tensioner pivot pin;
 a lock wheel pawl tensioner having a compression spring extending between said pawl tensioner pivot pin and said pawl tensioner mount pin;
 wherein said lock wheel pawl includes an upper arm coupled to said pawl tensioner mount pin.

8. The chuck guard apparatus as in claim 7, wherein said ratcheting assembly includes a collar mounted to said guard shaft, said collar comprising:
 a pawl over-center arm defining a notch configured to receive said pawl tensioner mount pin when said guard shaft is rotated a predetermined amount such that said lock wheel pawl is beyond a last tooth of said plurality of teeth;
 a pawl reset arm that is configured to urge said pawl tensioner mount pin upwardly when said guard shaft is rotated another predetermined amount such that said plurality of teeth are displaced from said lock wheel pawl.

9. The chuck guard apparatus as in claim 5, wherein said body section of said guard assembly is incrementally moved toward an opened configuration that is incrementally displaced from the chuck of the lathe as said guard shaft and said serrated lock wheel are rotated.

10. The chuck guard apparatus as in claim 1, wherein said body section of said guard assembly is incrementally moved toward an opened configuration that is incrementally displaced from the chuck of the lathe as said ratcheting assembly is incrementally moved toward said predetermined angular positions.

11. The chuck guard apparatus as in claim 1, further comprising a positioning assembly comprising:
 a first rail member;
 a second rail member laterally displaced from and parallel to said first rail member;
 wherein said guard assembly is positioned atop said positioning assembly and slidably between a deployed configuration situated forwardly atop said first and second rail members so as to block access to the chuck of the lathe and a stowed configuration situated rearwardly atop said first and second rail members so as to allow access to the chuck of the lathe.

12. The chuck guard apparatus as in claim 11, wherein said positioning assembly includes a safety sensor positioned on said first rail member that is configured to detect when said guard assembly is in said deployed configuration, said safety sensor being in electrical communication with the lathe so as to prevent operation thereof when energized.

13. The chuck guard apparatus as in claim 1, further comprising a visibility panel coupled to a second edge of said main body section and extending outwardly and downwardly from said main body section at an offset angle, said visibility panel having a transparent portion through which the chuck is viewable.

14. A ratcheting anti-lock chuck guard apparatus for selectively restricting access to a chuck associated with a lathe, said chuck guard apparatus comprising:
   a guard assembly having a main body section positioned proximate the chuck and having an actuation section pivotally coupled to and extending away from a first edge of said main body section;
   an access assembly having a mounting member coupled to a distal end of said actuation section and a ratcheting assembly coupled to said mounting member, said ratcheting assembly being rotatably movable to predetermined angular positions when urged by actuation of said guard assembly;
   wherein said ratcheting assembly includes:
      a serrated lock wheel coupled to a proximal end of said mounting member and having a plurality of teeth each defining a lock pocket; and
      a lock wheel pawl mounted proximate said serrated lock wheel and configured to lock successively into respective lock pockets when said serrated lock wheel is rotated;
   wherein said mounting member includes a guard mount coupled to said actuation section of said guard assembly and a guard shaft coupled at one end to said guard mount and at another end to said serrated lock wheel wherein a rotation of said guard shaft causes a corresponding rotation of said serrated lock wheel;
   wherein said body section of said guard assembly is incrementally moved toward an opened configuration that is incrementally displaced from the chuck of the lathe as said as said guard shaft and said serrated lock wheel are rotated.

15. The chuck guard apparatus as in claim 14, wherein said main body section and said actuation section are each length adjustable.

16. The chuck guard apparatus as in claim 14, wherein said ratcheting assembly includes:
   a safety switch cam mounted to said guard shaft and configured to rotate therewith, said safety switch cam having a curved portion and a flat portion;
   a safety switch in electrical communication with the lathe and having a switch housing and a roller plunger in communication with said safety switch cam that is movable between a compressed configuration compressed inwardly towards said switch housing when said roller plunger is in contact with said curved portion of said safety switch cam and a deployed configuration extending outwardly away from said switch housing when said roller plunger is in contact with said flat portion of said cam;
   wherein said safety switch is electrically configured to prevent operation of said lathe when said roller plunger is in said compressed configuration and allow operation of said lathe when said roller plunger is in said deployed configuration.

17. The chuck guard apparatus as in claim 14, wherein said ratcheting assembly includes a pawl tensioning assembly comprising:
   a pawl tensioner pivot pin coupled to a frame member and that defines a pivot axis;
   a pawl tensioner mount pin parallel to and displaced from said pawl tensioner pivot pin;
   a lock wheel pawl tensioner having a compression spring extending between said pawl tensioner pivot pin and said pawl tensioner mount pin;
   wherein said lock wheel pawl includes an upper arm coupled to said pawl tensioner mount pin.

18. The chuck guard apparatus as in claim 17, wherein said ratcheting assembly includes a collar mounted to said guard shaft, said collar comprising:
   a pawl over-center arm defining a notch configured to receive said pawl tensioner mount pin when said guard shaft is rotated a predetermined amount such that said lock wheel pawl is positioned past a last tooth of said plurality of teeth; and
   a pawl reset arm that is configured to urge said pawl tensioner mount pin upwardly when said guard shaft is rotated another predetermined amount such that said plurality of teeth are displaced from said lock wheel pawl so that said serrated lock wheel is released to return to a reset configuration.

19. The chuck guard apparatus as in claim 14, further comprising a positioning assembly comprising:
   a first rail member;
   a second rail member laterally displaced from and parallel to said first rail member;
   wherein said guard assembly is positioned atop said positioning assembly and slidably between a deployed configuration situated forwardly atop said first and second rail members so as to block access to the chuck of the lathe and a stowed configuration situated rearwardly atop said first and second rail members so as to allow access to the chuck of the lathe.

20. The chuck guard apparatus as in claim 19, wherein said positioning assembly includes a safety sensor positioned on said first rail member that is configured to detect when said guard assembly is in said deployed configuration, said safety sensor being in electrical communication with the lathe so as to prevent operation thereof when energized.

\* \* \* \* \*